United States Patent
Kito

(10) Patent No.: US 10,725,307 B2
(45) Date of Patent: Jul. 28, 2020

(54) WAVELENGTH CONVERSION ELEMENT, WAVELENGTH CONVERTER, LIGHT SOURCE APPARATUS, AND PROJECTOR

(71) Applicant: SEIKO EPSON CORPORATION, Tokyo (JP)

(72) Inventor: Satoshi Kito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/162,917

(22) Filed: Oct. 17, 2018

(65) Prior Publication Data

US 2019/0113763 A1   Apr. 18, 2019

(30) Foreign Application Priority Data

Oct. 18, 2017   (JP) .................................. 2017-201613

(51) Int. Cl.

| | |
|---|---|
| G02B 26/00 | (2006.01) |
| G02B 27/10 | (2006.01) |
| F21S 10/00 | (2006.01) |
| F21S 10/02 | (2006.01) |
| G03B 33/08 | (2006.01) |
| G03B 21/00 | (2006.01) |
| G03B 21/20 | (2006.01) |
| F21V 9/40 | (2018.01) |

(52) U.S. Cl.
CPC ........ *G02B 27/1046* (2013.01); *F21S 10/007* (2013.01); *F21S 10/02* (2013.01); *F21V 9/40* (2018.02); *G02B 26/007* (2013.01); *G03B 21/005* (2013.01); *G03B 21/204* (2013.01); *G03B 21/2066* (2013.01); *G03B 33/08* (2013.01)

(58) Field of Classification Search
CPC ..................................................... F21S 10/007
See application file for complete search history.

(56) References Cited

U.S. PATENT DOCUMENTS

| | | | |
|---|---|---|---|
| 2011/0116253 A1 | 5/2011 | Sugiyama | |
| 2016/0293803 A1* | 10/2016 | Kim | ...................... H01L 33/465 |
| 2017/0068089 A1* | 3/2017 | Mehl | .................... G03B 21/204 |

FOREIGN PATENT DOCUMENTS

| | | |
|---|---|---|
| JP | 2004-341105 A | 12/2004 |
| JP | 2011-108535 A | 6/2011 |
| JP | 2016-062012 A | 4/2016 |

* cited by examiner

*Primary Examiner* — Joseph L Williams
*Assistant Examiner* — Jacob R Stern
(74) *Attorney, Agent, or Firm* — Oliff PLC

(57) ABSTRACT

A wavelength conversion element includes a substrate having a first surface, a first phosphor layer that has a first excitation light incident surface on which excitation light having a first wavelength is incident, is so provided as to face the first surface, a second phosphor layer that is so provided as to be in contact with part of the first excitation light incident surface, and a reflection layer that is provided between the first phosphor layer and the substrate. The first phosphor layer has an annular shape. The area of the second phosphor layer viewed in the direction in which the excitation light is incident is smaller than the area of the first phosphor layer viewed in the direction in which the excitation light is incident. The thickness of the second phosphor layer is smaller than the thickness of the first phosphor layer.

17 Claims, 4 Drawing Sheets

WAVELENGTH CONVERSION ELEMENT, WAVELENGTH CONVERTER, LIGHT SOURCE APPARATUS, AND PROJECTOR

BACKGROUND

1. Technical Field

The present invention relates to a wavelength conversion element, a wavelength converter, a light source apparatus, and a projector.

2. Related Art

As a light source apparatus used in a projector, there is a proposed light source apparatus using fluorescence emitted from a phosphor irradiated with excitation light outputted from a light emitting device, such as a semiconductor laser.

JP-A-2004-341105 discloses a "projection-type display apparatus" including a solid-state light source that emits ultraviolet light, a color wheel having a wavelength conversion layer that converts the ultraviolet light into visible light, a spatial light modulator, and a projection lens. The color wheel illustrated in JP-A-2004-341105 includes a circular substrate divided into three regions each provided with any of a phosphor layer for blue light, a phosphor layer for green light, and a phosphor layer for red light.

JP-A-2016-062012 discloses a "light source apparatus" including a fluorescing plate including a front-side phosphor layer, which emits fluorescence that belongs to a predetermined wavelength region, a rear-side phosphor layer that emits fluorescence that belongs to a wavelength region different from the wavelength region to which the fluorescence emitted from the front-side phosphor layer belongs, and a dichroic filter provided between the front-side phosphor layer and the rear-side phosphor layer, and an excitation light source. JP-A-2016-062012 describes that when the front-side phosphor layer, which contains a green phosphor, and the rear-side phosphor layer, which contains a cyan phosphor, are irradiated with excitation light, green fluorescence having a color tone adjusted by cyan exits toward the front side of the fluorescing plate, and blue light (excitation light) having a color tone adjusted by cyan exits toward the rear side of the fluorescing plate.

In a light source apparatus including a phosphor, the color of the light exiting from the light source apparatus is basically determined by the characteristics of the material of the phosphor, but there is a demand for further adjustment of the color tone of the exiting light. In this case, JP-A-2004-341105 and JP-A-2016-062012 described above have the following problems.

The color wheel described in JP-A-2004-341105 has three regions provided along the direction in which the color wheel rotates, and the three regions are provided with the phosphor layers for colors different from one another. It is, however, difficult to form phosphor layers made of different phosphor materials on a substrate with no gap between the phosphor layers, and a gap between two phosphor layers adjacent to each other undesirably lowers the wavelength conversion efficiency. Further, since the color tone of the color light exiting from each of the regions is determined by the characteristics of the phosphor material used in the region, it is undesirably difficult to make fine adjustment of the color tone.

The light source apparatus described in JP-A-2016-062012, which adjusts the color tones of the green light and the blue light by using the cyan light, has a configuration in which the green light and the blue light exit via the opposite surfaces of the fluorescing plate in opposite directions, and the green light and the blue light do not exit in the same direction. Use of the light source apparatus in a projector therefore undesirably restricts the configuration of the optical system of the projector.

SUMMARY

An advantage of some aspects of the invention is to provide a wavelength conversion element capable of adjusting the color tone of exiting light with no decrease in wavelength conversion efficiency. Another advantage of some aspects of the invention is to provide a wavelength converter including the wavelength conversion element. Another advantage of some aspects of the invention is to provide a light source apparatus including the wavelength converter. Another advantage of some aspects of the invention is to provide a projector including the light source apparatus.

A wavelength conversion element according to an aspect of the invention includes a substrate having a first surface, a first phosphor layer that has a first excitation light incident surface on which excitation light having a first wavelength is incident, is so provided as to face the first surface, and converts in terms of wavelength the excitation light into light having a second wavelength different from the first wavelength, a second phosphor layer that is so provided as to be in contact with part of the first excitation light incident surface and converts in terms of wavelength the excitation light into light having a third wavelength different from the first and second wavelengths, and a reflection layer that is provided between the first phosphor layer and the substrate and reflects the light having the second wavelength and the light having the third wavelength. The first phosphor layer has an annular shape when viewed in a direction in which the excitation light is incident. An area of the second phosphor layer viewed in the direction in which the excitation light is incident is smaller than an area of the first phosphor layer viewed in the direction in which the excitation light is incident. A thickness of the second phosphor layer is smaller than a thickness of the first phosphor layer.

In the wavelength conversion element according to the aspect of the invention, since the second phosphor layer is so provided as to be in contact with part of the first excitation light incident surface of the first phosphor layer, the first excitation light incident surface of the first phosphor layer has a region where the second phosphor layer is provided and a region where no second phosphor layer is provided. Since the thickness of the second phosphor layer is smaller than the thickness of the first phosphor layer in the region where the second phosphor layer is provided, part of the excitation light is converted in terms of wavelength into the light having the third wavelength in the second phosphor layer, and the other part of the excitation light passes through the second phosphor layer, reaches the first phosphor layer, and is converted in terms of wavelength into the flight having the second wavelength in the first phosphor layer. In the region where no second phosphor layer is provided, the excitation light is converted in terms of wavelength into the light having the second wavelength in the first phosphor layer.

The light having the second wavelength and the light having the third wavelength having produced in the phosphor layers are both reflected off the reflection layer and exit out of the phosphor layers in the same direction. As described above, in the wavelength conversion element according to the aspect of the invention, the first phosphor layer and the second phosphor layer are layered on each other in the thickness direction of the phosphor layers but are not disposed side by side in the circumferential direction of the phosphor layers. Therefore, no gap is created between the first phosphor layer and the second phosphor layer, and no decrease in the wavelength conversion efficiency resulting from a gap between the phosphor layers adjacent to each other therefore occurs. Further, the color tone of the exiting light can be adjusted by changing the ratio of the area or thickness of the second phosphor layer to the area or thickness of the first phosphor layer.

In the wavelength conversion element according to the aspect of the invention, the second phosphor layer may be provided in each of a first position on the first excitation light incident surface of the first phosphor layer and a second position different from the first position.

In the aspect of the invention, the second phosphor layer is provided on the first excitation light incident surface of the first phosphor layer. Therefore, in a case where the wavelength conversion element is used in a wavelength converter having a configuration in which the excitation light irradiation position moves in the circumferential direction of the first phosphor layer, the period for which only the light having the second wavelength is outputted and the period for which the mixture of the light having the second wavelength and the light having the third wavelength is outputted are switched from one to the other. In this process, according to the aspect of the invention, in which the second phosphor layer is provided in each of the first and second positions on the first excitation light incident surface, the number of color light switching actions in the one turn of the excitation light irradiation position along the first phosphor layer increases as compared with a case where only one second phosphor layer is provided. The color light switching cycle therefore shortens. Color breakup of the exiting light is therefore unlikely to occur.

In the wavelength conversion element according to the aspect of the invention, the first phosphor layer may have an annular shape when viewed in the direction in which the excitation light is incident, and the second phosphor layer may have a roughly rectangular shape when viewed in the direction in which the excitation light is incident.

According to the configuration described above, it is unnecessary to process the second phosphor layer into an arcuate shape and the second phosphor layer is therefore readily produced. Further, when the second phosphor layer is provided on the first surface of the first phosphor layer, the margin of the alignment between the first and second phosphor layers is readily increased as compared with the case where the second phosphor layer has an arcuate shape, whereby the alignment between the first and second phosphor layers can be readily performed.

In the wavelength conversion element according to the aspect of the invention, the second phosphor layer may have a second excitation light incident surface on which the excitation light is incident, and the first excitation light incident surface and the second excitation light incident surface may be located in a roughly the same plane.

According to the configuration described above, since no step is created between the region where the second phosphor layer is provided and the region where no second phosphor layer is provided, the overall thickness of the phosphor layers can be reduced.

A wavelength converter according to another aspect of the invention includes the wavelength conversion element according to the aspect of the invention and a rotation driver that rotates the wavelength conversion element around an axis of rotation perpendicular to the first surface of the substrate.

According to the configuration described above, rotating the wavelength conversion element allows suppression of an increase in temperature of each of the first phosphor layers, whereby the wavelength conversion efficiency can be increased.

A light source apparatus according to another aspect of the invention includes the wavelength conversion element according to the aspect of the invention and an excitation light source that outputs the excitation light.

The light source apparatus according to the aspect of the invention, which includes the wavelength conversion element according to the aspect of the invention, can be a light source apparatus that produces high-intensity light.

A projector according to another aspect of the invention includes the light source apparatus according to the aspect of the invention, a light modulator that modulates light from the light source apparatus in accordance with image information to form image light, and a projection optical apparatus that projects the image light.

The projector according to the aspect of the invention, which includes the light source apparatus according to the aspect of the invention, can be a high-luminous-flux projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to the drawings.

In the following drawings, components are drawn at different dimensional scales in some cases for clarity of each of the components.

An example of a projector according to the first embodiment will be described.

The projector according to the first embodiment is a projection-type image display apparatus that displays a color image on a screen (projection surface). The projector includes three liquid crystal light modulators corresponding to color light fluxes of red light, green light, and blue light. The projector further includes a semiconductor laser, which produces high-luminance, high-power light, as a light source of an illuminator.

Figure 1:
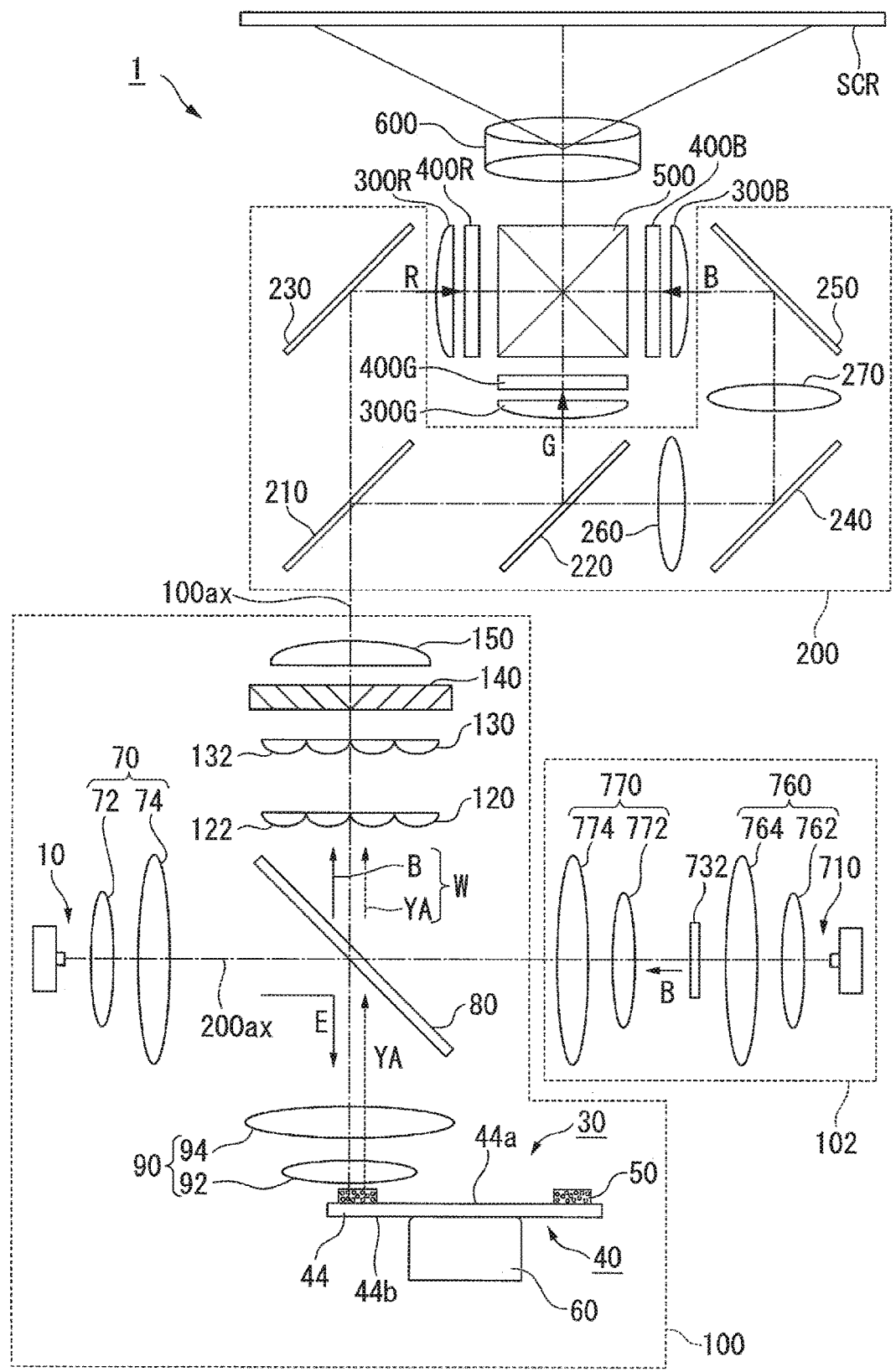
FIG. 1 is a schematic configuration diagram of a projector according to a first embodiment.

FIG. 1 is a schematic configuration diagram showing the optical system of the projector according to the present embodiment.

A projector 1 includes a first light source apparatus 100, a second light source apparatus 102, a color separation/light guide system 200, a liquid crystal light modulator 400R, a liquid crystal light modulator 400G, a liquid crystal light modulator 400B, a cross dichroic prism 500, and a projection optical apparatus 600, as shown in FIG. 1.

The first light source apparatus 100 in the present embodiment corresponds to the light source apparatus in the appended claims.

The first light source apparatus 100 includes a first light source 10, a collimation system 70, a dichroic mirror 80, a collimation/light collection system 90, a wavelength converter 30, a first lens array 120, a second lens array 130, a polarization conversion element 140, and a superimposing lens 150.

The first light source 10 in the present embodiment corresponds to the excitation light source in the appended claims.

The first light source 10 is formed of a semiconductor laser that outputs blue excitation light E having a wavelength of 445 nm (excitation light having first wavelength). The first light source 10 may be formed of a single semiconductor laser or a plurality of semiconductor lasers. The first light source 10 may instead be formed of a semiconductor laser that outputs blue excitation light having a peak wavelength other than 445 nm, for example, a wavelength of 460 nm. The first light source 10 is so disposed that the optical axis 200ax of the excitation light E outputted from the first light source 10 is perpendicular to an illumination optical axis 100ax. In the present specification, the wavelength means a wavelength at which the emitted light intensity peaks.

The collimation system 70 includes a first lens 72 and a second lens 74. The collimation system 70 roughly parallelizes the light outputted from the first light source 10. The first lens 72 and the second lens 74 are each formed of a convex lens.

The dichroic mirror 80 is so disposed in the optical path from the collimation system 70 to the collimation/light collection system 90 as to incline by 45° with respect to the optical axis 200ax and the illumination optical axis 100ax. The dichroic mirror 80 reflects the blue excitation light E outputted from the first light source 10 and transmits yellow fluorescence YA outputted from the wavelength converter 30, which will be described later.

The collimation/light collection system 90 has the function of focusing the excitation light E reflected off the dichroic mirror 80 and causing the focused excitation light E to be incident on a wavelength conversion element 40, which will be described later, and the function of roughly parallelizing the fluorescence YA outputted from the wavelength conversion element 40 and causing the roughly parallelized fluorescence YA to be incident on the dichroic mirror 80. The collimation/light collection system 90 includes a first lens 92 and the second lens 94. The first lens 92 and the second lens 94 are each formed of a convex lens.

The second light source apparatus 102 includes a second light source 710, a light collection system 760, a diffuser plate 732, and a collimation system 770.

The second light source 710 is formed of a semiconductor laser identical to the semiconductor laser that forms the first light source 10. In the case where the first light source 10 is formed of a semiconductor laser that outputs light having a light emission peak wavelength of 445 nm, the second light source 710 may be formed of a semiconductor laser that outputs light having a light emission peak wavelength of 460 nm. The second light source 710 may be formed of a single semiconductor laser or a plurality of semiconductor lasers.

The light collection system 760 includes a first lens 762 and a second lens 764. The light collection system 760 collects blue light B outputted from the second light source 710 on the diffuser plate 732 or in the vicinity thereof. The first lens 762 and the second lens 764 are each formed of a convex lens.

The diffuser plate 732 diffuses the blue light B from the second light source 710 to produce blue light B having a light orientation distribution close to the light orientation distribution of the fluorescence YA outputted from the wavelength converter 30. The diffuser plate 732 can, for example, be a ground glass plate made of optical glass.

The collimation system 770 includes a first lens 772 and a second lens 774. The collimation system 770 roughly parallelizes the diffused light having exited out of the diffuser plate 732. The first lens 772 and the second lens 774 are each formed of a convex lens.

The blue light B outputted from the second light source apparatus 102 is reflected off the dichroic mirror 80 and combined with the fluorescence YA having passed through the dichroic mirror 80 into white light W. The white light W is incident on the first lens array 120.

The first lens array 120 includes a plurality of first lenses 122 for dividing the light from the dichroic mirror 80 into a plurality of sub-light fluxes. The plurality of first lenses 122 are arranged in a matrix in a plane perpendicular to the illumination optical axis 100ax.

The second lens array 130 includes a plurality of second lenses 132 corresponding to the plurality of first lenses 122 of the first lens array 120. The second lens array 130, along with the downstream superimposing lens 150, forms images of the first lenses 122 of the first lens array 120 in the vicinity of an image formation region of each of the liquid crystal light modulators 400R, 400G, and 400B. The plurality of second lenses 132 are arranged in a matrix in a plane perpendicular to the illumination optical axis 100ax.

The polarization conversion element 140 converts the divided sub-light fluxes from the first lens array 120 into linearly polarized light fluxes having an aligned polarization direction. The polarization conversion element 140 includes, although not shown, polarization separation layers, reflection layers, and retardation layers.

The superimposing lens 150 collects the sub-light fluxes having exited out of the polarization conversion element 140 and superimposes the collected sub-light fluxes on one another in the vicinity of the image formation region of each of the liquid crystal light modulators 400R, 400G, and 400B. The first lens array 120, the second lens array 130, and the superimposing lens 150 form an optical integration system that homogenizes the in-plane optical intensity distribution of the light from the wavelength converter 30.

The color separation/light guide system 200 includes a dichroic mirror 210, a dichroic mirror 220, a reflection mirror 230, a reflection mirror 240, a reflection mirror 250, a relay lens 260, and a relay lens 270. The color separation/light guide system 200 separates the white light W produced from the light from the first light source apparatus 100 and the light from the second light source apparatus 102 into red light R, green light G, and blue light B and guides the red light R, the green light G, and the blue light B to the corresponding liquid crystal light modulators 400R, 400G, and 400B.

A field lens 300R is disposed between the color separation/light guide system 200 and the liquid crystal light modulator 400R. A field lens 300G is disposed between the color separation/light guide system 200 and the liquid crystal light modulator 400G. A field lens 300B is disposed between the color separation/light guide system 200 and the liquid crystal light modulator 400B.

The dichroic mirror 210 is a dichroic mirror that transmits a red light component and reflects a green light component and a blue light component. The dichroic mirror 220 is a dichroic mirror that reflects the green light component and transmits the blue light component. The reflection mirror 230 is a reflection mirror that reflects the red light component. The reflection mirrors 240 and 250 are reflection mirrors that reflect the blue light component.

The red light R having passed through the dichroic mirror 210 is reflected off the reflection mirror 230, passes through the field lens 300R, and is incident on the image formation region of the liquid crystal light modulator 400R. The green light G reflected off the dichroic mirror 210 is reflected off the dichroic mirror 220, passes through the field lens 300G, and is incident on the image formation region of the liquid crystal light modulator 400G. The blue light B having passed through the dichroic mirror 220 travels via the relay lens 260, the light-incident-side reflection mirror 240, the relay lens 270, the light-exiting-side reflection mirror 250, and the field lens 300B and is incident on the image formation region of the liquid crystal light modulator 400B.

The liquid crystal light modulators 400R, 400G, and 400B each modulate the color light incident thereon in accordance with image information to form a color image corresponding to the color light. Although not shown, light-incident-side polarizers are disposed on the light incident side of the liquid crystal light modulators 400R, 400G, and 400B. Light-exiting-side polarizers are disposed on the light exiting side of the liquid crystal light modulators 400R, 400G, and 400B.

The cross dichroic prism 500 combines the image light fluxes outputted from the liquid crystal light modulators 400R, 400G, and 400B with one another to form a color image. The cross dichroic prism 500 has a configuration in which four rectangular prisms are bonded to each other, and dielectric multilayer films are provided on the roughly X-letter-shaped interface between the bonded rectangular prisms.

The color image having exited out of the cross dichroic prism 500 is enlarged and projected by the projection optical apparatus 600 and forms an image on a screen SCR. The projection optical apparatus 600 is formed of a plurality of projection lenses.

The wavelength converter 30 will be described below in detail.

Figure 2:
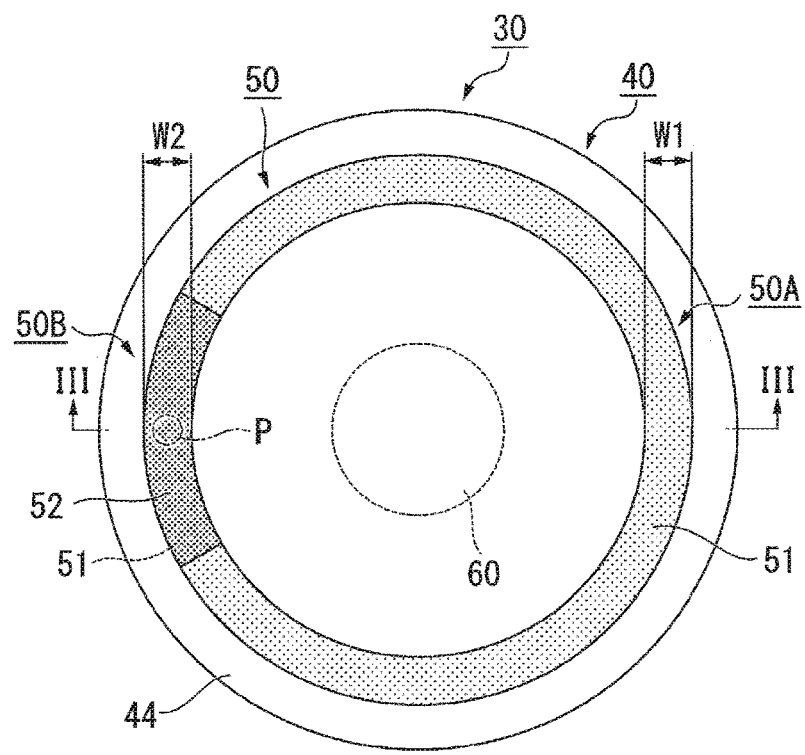
FIG. 2 is a plan view of a wavelength conversion element according to the first embodiment.
Figure 3:
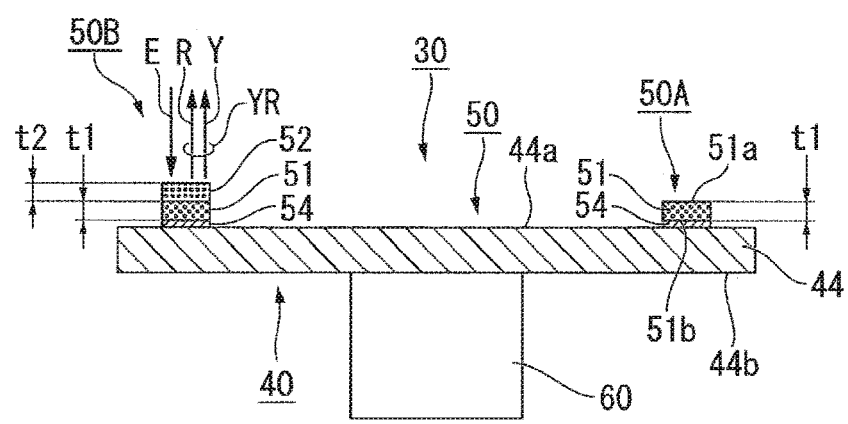
FIG. 3 is a cross-sectional view of the wavelength conversion element taken along the line in FIG. 2.

FIG. 2 is a plan view of the wavelength conversion element 40. FIG. 3 is a cross-sectional view of the wavelength conversion element 40 taken along the line III-III in FIG. 2.

The wavelength converter 30 includes the wavelength conversion element 40 and a motor 60 (rotation driver), as shown in FIGS. 1 to 3. The wavelength conversion element 40 includes a substrate 44, a first phosphor layer 51, a second phosphor layer 52, and a reflection layer 54. Although will be described later in detail, the wavelength conversion element 40 outputs the fluorescence YA toward the side on which the excitation light E is incident. That is, the wavelength conversion element 40 in the present embodiment is a reflective wavelength conversion element. In the following description, the phosphor layer as a whole including the first phosphor layer 51 and the second phosphor layer 52 is referred to as a wavelength conversion section 50 in some cases.

The substrate 44 is formed, for example, of a disc-shaped member made of a material having high thermal conductivity, such as aluminum and copper. The thus formed substrate 44 can provide high heat dissipation capability. In the present specification, the two surfaces of the substrate 44 are defined as follows: The surface on which the excitation light is incident is referred to as a first surface 44a; and the surface facing away from the first surface 44a is referred to as a second surface 44b.

The first phosphor layer 51 is so provided as to form an annular shape along the circumferential edge of the substrate 44 and face the first surface 44a of the substrate 44 via the reflection layer 54, which will be described later. The first phosphor layer 51 desirably has an annular shape along a circumferential edge portion of the circular substrate 44 but does not necessarily have an annular shape and may instead, for example, have a polygonal annular shape. The first phosphor layer 51 has a first surface 51a, on which the excitation light E is incident, and a second surface 51b, which faces away from the first surface 51a. The first phosphor layer 51 converts in terms of wavelength the excitation light E having a predetermined wavelength into fluorescence Y having a wavelength different from the wavelength of the excitation light E.

The first surface 51a in the present embodiment corresponds to the first excitation light reflection surface in the appended claims.

Specifically, the first phosphor layer 51 is formed of a YAG-based phosphor (Ce:YAG) made of $(Y_{1-x}GD_x)_3(Al, Ga)_5O_{12}$ ($0 \leq x \leq 1$) in which Ce is dispersed as an activator. In the present embodiment, the first phosphor layer 51 is formed of the Ce:YAG phosphor in the form of bulk. The first phosphor layer 51 may, however, be formed of phosphor particles made of the Ce:YAG phosphor material and a binder. Further, the first phosphor layer 51 may contain the same activator used in the second phosphor layer 52, which will be described later.

For example, the first phosphor layer 51 formed of the Ce:YAG phosphor absorbs the excitation light E having the peak wavelength of about 460 nm and produces the fluorescence Y, which is yellow fluorescence, has a peak wavelength of about 540 nm, and belongs to a wavelength region ranging from about 480 to 700 nm.

The excitation light E in the present embodiment corresponds to the excitation light having a first wavelength in the appended claims. The fluorescence Y in the present embodiment corresponds to the light having a second wavelength in the appended claims.

The yellow fluorescence Y outputted from the first phosphor layer 51 is referred to as first fluorescence Y for ease of description.

The second phosphor layer 52 is so provided as to be in contact with part of the first surface 51a of the first phosphor layer 51, as shown in FIGS. 2 and 3. The second phosphor layer 52 is formed in an arcuate shape when viewed in the direction in which the excitation light E is incident. In the present embodiment, the width W2 of the second phosphor layer 52 in the radial direction of the substrate 44 is equal to the width W1 of the first phosphor layer 51 in the radial direction of the substrate 44, and the length of the second phosphor layer 52 along the circumferential direction of the substrate 44 is shorter than the length of the first phosphor layer 51 along the circumferential direction of the substrate 44. The area of the second phosphor layer 52 viewed in the direction in which the excitation light E is incident is therefore smaller than the area of the first phosphor layer 51 viewed in the direction in which the excitation light E is incident. The second phosphor layer 52 converts in terms of wavelength the excitation light E into fluorescence R having a wavelength different from the wavelength of the excitation light E and the wavelength of the first fluorescence Y.

The fluorescence R in the present embodiment corresponds to light having a third wavelength in the appended claims. The fluorescence R, which is red fluorescence and outputted from the second phosphor layer 52, is referred to as second fluorescence R for ease of description.

Specifically, the second phosphor layer 52 is formed of a YAG-based phosphor (any of Pr:YAG, Eu:YAG, and Cr:YAG) made of $(Y_{1-x}, GD_x)_3(Al,Ga)_5O_{12}$ in which any of Pr, Eu, and Cr is dispersed as an activator. The activator may be one type selected from Pr, Eu, and Cr or may be a co-activator containing a plurality of types selected from Pr, Eu, and Cr. The second phosphor layer 52 is formed of the phosphor described above in the form of bulk in the present embodiment but may instead be formed of phosphor particles made of the phosphor material described above and a binder, as in the case of the first phosphor layer 51.

For example, in the case where the second phosphor layer 52 is formed of the Pr:YAG phosphor, the second phosphor layer 52 absorbs the excitation light E having the peak wavelength of about 460 nm and produces the red fluorescence R that has a peak wavelength of about 610 nm and belongs to a wavelength region ranging from about 500 inclusive to 800 nm.

For example, in the case where the second phosphor layer 52 is formed of the Eu:YAG phosphor, the second phosphor layer 52 absorbs the excitation light E having a peak wavelength of about 400 nm and produces the red fluorescence R that has a peak wavelength of about 590 nm and belongs to a wavelength region ranging from about 500 inclusive to 750 nm.

For example, in the case where the second phosphor layer 52 is formed of the Cr:YAG phosphor, the second phosphor layer 52 absorbs the excitation light E having a peak wavelength of about 450 nm and produces the red fluorescence R that has a peak wavelength of about 710 nm and belongs to a wavelength region ranging from about 600 to 800 nm.

The reflection layer 54 is provided between the first phosphor layer 51 (second surface 51b of first phosphor layer 51) and the substrate 44 (first surface 44a of substrate 44), as shown in FIG. 3. The reflection layer 54 is formed of a film made of a metal having high reflectance, for example, silver or aluminum. The reflection layer 54 reflects the first fluorescence Y and the second fluorescence R produced in the first phosphor layer 51 and the second phosphor layer 52.

In the wavelength conversion section 50, the region where no second phosphor layer 52 is present is referred to as a first region 50A, and the region where the second phosphor layer 52 is present is referred to as a second region 50B, as shown in FIGS. 2 and 3. In the present embodiment, the first region 50A occupies about 80% of the total area of the wavelength conversion section 50, and the second region 50B occupies about 20% of the total area of the wavelength conversion section 50. It is, however, noted that the ratio between the area of the first region 50A and the area of the second region 50B can be changed as appropriate in accordance with a required color tone of the exiting light (fluorescence YA).

The first region 50A of the wavelength conversion section 50 is formed of a one-layer phosphor layer formed of the first phosphor layer 51, and the second region 50B of the wavelength conversion section 50 is formed of a two-layer phosphor layer formed of the first phosphor layer 51 and the second phosphor layer 52, as shown in FIG. 3. The thickness t1 of the first phosphor layer 51 is fixed across the first region 50A and the second region 50B. The wavelength conversion section 50 therefore has steps at the boundaries between the first region 50A and the second region 50B. In the second region 50B, the thickness t2 of the second phosphor layer 52 is smaller than the thickness t1 of the first phosphor layer 51.

The motor 60 rotates the wavelength conversion element 40 around an axis of rotation perpendicular to the first surface 44a or a second surface 44b of the substrate 44. In the present embodiment, rotating the wavelength conversion element 40 allows the position P, where the wavelength conversion section 50 is irradiated with the excitation light E (see FIG. 2), to change with time. The rotation of the wavelength conversion element 40 avoids a situation in which the same location on the wavelength conversion section 50 keeps being irradiated with the excitation light E so that the wavelength conversion element 40 (wavelength conversion section 50) is locally heated and therefore degraded.

The wavelength conversion element 40 having the configuration described above is produced by carrying out the following steps.

A Ce:YAG phosphor material that forms the first phosphor layer 51 is first applied in an annular shape onto the first surface 44a of the substrate 44, and any of a Pr:YAG phosphor material, an Eu:YAG phosphor material, and a Cr:YAG phosphor material that forms the second phosphor layer 52 is then applied in an arcuate shape onto the upper surface of the Ce:YAG phosphor material (application step).

The two-layer phosphor materials produced in the preceding step are then so burned as to be integrated with each other to form the wavelength conversion section 50 (burning step). Since the two types of phosphor materials only differ from each other in terms of the activator and the main parts of the phosphor materials are made of the common YAG, the burning can be performed in a single step.

The wavelength conversion element 40 in the present embodiment is completed after the steps described above are carried out.

To use the wavelength converter 30 according to the present embodiment, the wavelength conversion element 40 is irradiated with the excitation light E and rotated at high speed at the same time. When the position P, where the wavelength conversion section 50 is irradiated with the excitation light E, falls within the first region 50A, the first phosphor layer 51 is irradiated with the excitation light E, and the first fluorescence Y (yellow fluorescence Y) is outputted from the first phosphor layer 51.

When the position P, where the wavelength conversion section 50 is irradiated with the excitation light E, falls within the second region 50B, the second phosphor layer 52 is irradiated with the excitation light E. In the second region 50B, since the thickness t2 of the second phosphor layer 52 is smaller than the thickness t1 of the first phosphor layer 51, appropriately setting the thickness t2 of the second phosphor layer 52 allows part of the excitation light E to be converted in terms of wavelength into the second fluorescence R (red fluorescence R) in the second phosphor layer 52 and the other part of the excitation light E to pass through the second phosphor layer 52, and the other part of excitation light E reaches the first phosphor layer 51 and is converted in terms of wavelength into the first fluorescence Y in the first phosphor layer 51. Out of the first fluorescence Y and the second fluorescence R, the two types of fluorescence having traveled toward the substrate 44 are both reflected off the reflection layer 54 and exit out of the wavelength conversion section 50 in the same direction. In this process, the yellow first fluorescence Y and the red second fluorescence R are mixed with each other, resulting in yellow fluorescence YR, which is more reddish than in a case where only the first fluorescence Y is used.

Ce:YAG presented as an example of the material of the first phosphor layer 51 is typically and frequently used but tends to lack for the red light component. From this point of view, the wavelength conversion element 40 according to the present embodiment is preferable because it provides the yellow fluorescence YR, which is more reddish than pure yellow fluorescence.

Further, since the wavelength conversion element 40 rotates at high speed, the period for which the first fluorescence Y is outputted and the period for which the fluorescence YR, which is the mixture of the first fluorescence Y and the second fluorescence R, is outputted are switched at high speed from one to the other. The first fluorescence Y and the fluorescence YR, which is the mixture of the first fluorescence Y and the second fluorescence R, are therefore temporally mixed with each other when perceived with human eyes, resulting in the yellow fluorescence YA, which is more reddish than pure yellow fluorescence.

That is, the fluorescence YA is the temporal combination of the fluorescence Y, which is outputted from the first region 50A (first phosphor layer 51) of the wavelength conversion section 50, and the fluorescence YR, which is outputted from the second region 50B (first phosphor layer 51+second phosphor layer 52) of the wavelength conversion section 50. Further, the fluorescence YR is the combination of the yellow first fluorescence Y and the red second fluorescence R combined in the second region 50B of the wavelength conversion section 50. The white light W is the combination of the blue light B and the fluorescence YA.

As described above, in the wavelength conversion element 40 according to the present embodiment, the first phosphor layer 51 and the second phosphor layer 52, which form the wavelength conversion section 50, are layered on each other in the thickness direction of the substrate 44 but are not disposed side by side in the circumferential direction of the substrate 44. Therefore, in the wavelength conversion element 40 according to the present embodiment, no gap is created between the first phosphor layer 51 and the second phosphor layer 52, and no decrease in the wavelength conversion efficiency resulting from a gap between the two phosphor layers therefore occurs. Further, the color tone of the exiting light can be adjusted by changing the ratio of the area of the second phosphor layer 52 to the area of the first phosphor layer 51 or the ratio of the thickness of the second phosphor layer 52 to the thickness of the first phosphor layer 51.

The first light source apparatus 100 in the present embodiment, which includes the wavelength conversion element 40 described above, can produce high-intensity output light (white light W).

The projector 1 according to the present embodiment, which includes the first light source apparatus 100 described above, can be a high-luminous-flux projector.

Second Embodiment

A second embodiment of the invention will be described below with reference to FIG. 4.

A projector, a light source apparatus, and a wavelength converter according to the second embodiment have the same basic configurations as those in the first embodiment, but a wavelength conversion element according to the second embodiment has a configuration different from that in the first embodiment. Overall descriptions of the projector, the light source apparatus, and the wavelength converter will therefore be omitted, and only the wavelength conversion element will be described.

Figure 4:
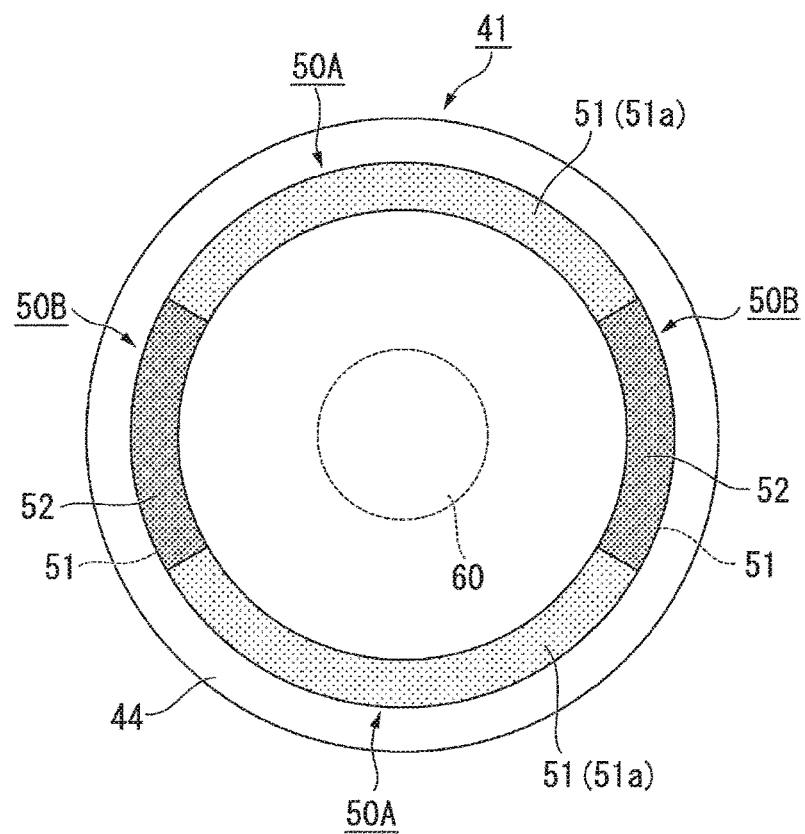
FIG. 4 is a plan view of a wavelength conversion element according to a second embodiment.

FIG. 4 is a plan view of a wavelength conversion element 41 according to the second embodiment.

In FIG. 4, components common to those in the drawings used in the first embodiment have the same reference characters and will not be described in detail.

The wavelength conversion element 41 according to the second embodiment includes the substrate 44, the first phosphor layer 51, two second phosphor layers 52, and the reflection layer (not shown), as shown in FIG. 4. The second phosphor layers 52 are provided in a first position along the circumferential direction of the first surface 51a of the first phosphor layer 51 and a second position different from the first position. Two second phosphor layers 52 are provided in the present embodiment, but the number of second phosphor layers 52 is not limited to two and can be changed as appropriate. The other configurations are the same as those in the first embodiment.

The present embodiment also provides the same effects as those provided by the first embodiment, specifically, the wavelength conversion element 41 capable of adjusting the color tone of the exiting light with no decrease in the wavelength conversion efficiency can be provided.

Further, in the wavelength conversion element 41 according to the present embodiment, the configuration in which the two second phosphor layers 52 are provided on the first phosphor layer 51 shortens the cycle in which a first period for which the first fluorescence is outputted and a second period for which the mixture of the first fluorescence and the second fluorescence is outputted is switched from one to the other in every single turn of the wavelength conversion element 41, as compared with the wavelength conversion element 40 according to the first embodiment. Color breakup of the exiting light is therefore unlikely to occur.

Third Embodiment

A third embodiment of the invention will be described below with reference to FIG. 5.

A projector, a light source apparatus, and a wavelength converter according to the third embodiment have the same basic configurations as those in the first embodiment, but a wavelength conversion element according to the third embodiment has a configuration different from that in the first embodiment. Overall descriptions of the projector, the light source apparatus, and the wavelength converter will therefore be omitted, and only the wavelength conversion element will be described.

Figure 5:
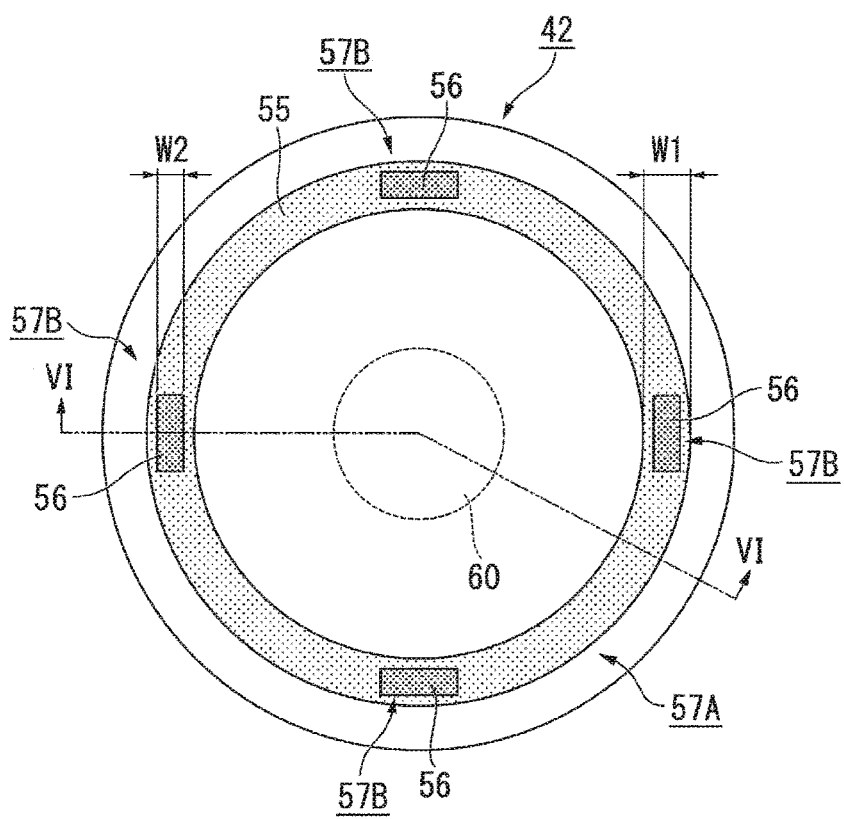
FIG. 5 is a plan view of a wavelength conversion element according to a third embodiment.
Figure 6:
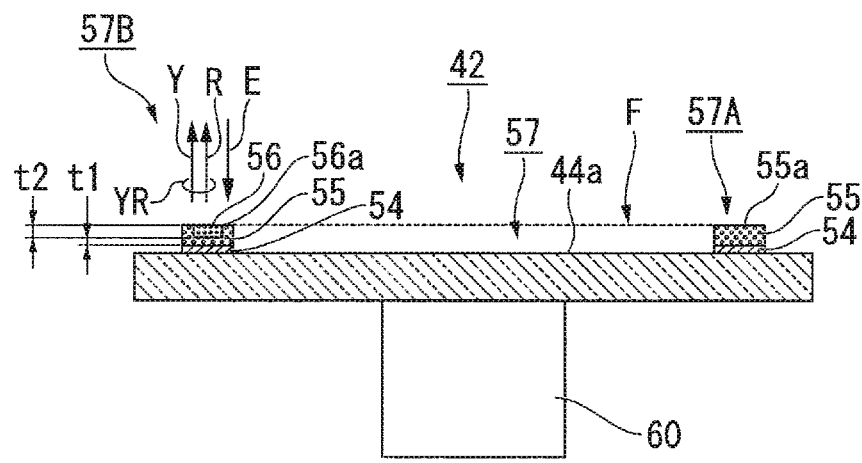
FIG. 6 is a cross-sectional view of the wavelength conversion element taken along the line VI-VI in FIG. 5.

FIG. 5 is a plan view of a wavelength conversion element 42 according to the third embodiment. FIG. 6 is a cross-sectional view of the wavelength conversion element 42 taken along the line VI-VI in FIG. 5.

In FIGS. 5 and 6, components common to those in the drawings used in the first embodiment have the same reference characters and will not be described in detail.

The wavelength conversion element 42 according to the third embodiment includes the substrate 44, a first phosphor layer 55, four second phosphor layers 56, and the reflection layer 54, as shown in FIGS. 5 and 6. The four second phosphor layers 56 are provided in positions different from one another along the circumferential direction of a first surface 55a of the first phosphor layer 55. Four second phosphor layers 56 are provided in the present embodiment, but the number of second phosphor layers 56 is not limited to four and can be changed as appropriate.

When viewed in the direction in which the excitation light E is incident, the first phosphor layer 55 has a roughly annular shape, and the second phosphor layers 56 each have a roughly rectangular shape. The width W2 of the second phosphor layers 52 in the radial direction of the substrate 44 is smaller than the width W1 of the first phosphor layer 55 in the radial direction of the substrate 44.

The first phosphor layer 55 has a recess in each of second regions 57B (regions where second phosphor layers 56 are provided) of a wavelength conversion section 57, and the second phosphor layers 56 each have a first surface 56a, on which the excitation light E is incident, and are provided in the recesses in the first phosphor layer 55, as shown in FIG. 6. That is, the second phosphor layers 56 are buried in the recesses in the first phosphor layer 55. The first surfaces 56a of the second phosphor layers 56 and the first surface 55a of the first phosphor layer 55 in a first region 57A (region where no second phosphor layer 56 is provided) are therefore located in the same plane F. That is, the wavelength conversion section 57 has no step on the surface on which the excitation light E is incident. The other configurations are the same as those in the first embodiment. The first surfaces 56a in the present embodiment correspond to the second excitation light incident surface in the appended claims.

The present embodiment also provides the same effects as those provided by the first embodiment, specifically, the wavelength conversion element 42 capable of adjusting the color tone of the exiting light with no decrease in the wavelength conversion efficiency can be provided.

Further, in the present embodiment, the first phosphor layer 55 has a roughly annular shape, the second phosphor layers 56 each have a roughly rectangular shape, and the width W2 of the second phosphor layers 52 is smaller than the width W1 of the first phosphor layer. Therefore, when the second phosphor layers 56 are provided on the first surface 55a of the first phosphor layer 55, the alignment therebetween is readily performed.

To produce the wavelength conversion section 57 in the present embodiment, the material of the second phosphor layers 56 may be so applied as to fill the recesses in the first phosphor layer 55, and the entire structure may be sintered in a single step. Instead, rectangular second phosphor layers 56 may be produced in advance, and the second phosphor layers 56 may be fit into and bonded to the recesses in the first phosphor layer 55. In the latter case, and in a case where, for example, a large block of the material of the second phosphor layers is diced or otherwise divided to produce the second phosphor layers 56 and the second phosphor layers 56 each have a rectangular shape, it is unnecessary to process each of the second phosphor layers 56 into an arcuate shape, and the block of the material is readily divided.

In the present embodiment, since no step is created between the first region 57A and the second regions 57B of the wavelength conversion section 57, the thickness of the wavelength conversion section 57 can be reduced.

Fourth Embodiment

A fourth embodiment of the invention will be described below with reference to FIG. 7.

A wavelength conversion element according to the present embodiment differs from the wavelength conversion elements according to the embodiments described above in that the former is a transmissive wavelength conversion element and the latter is a reflective wavelength conversion element.

Figure 7:
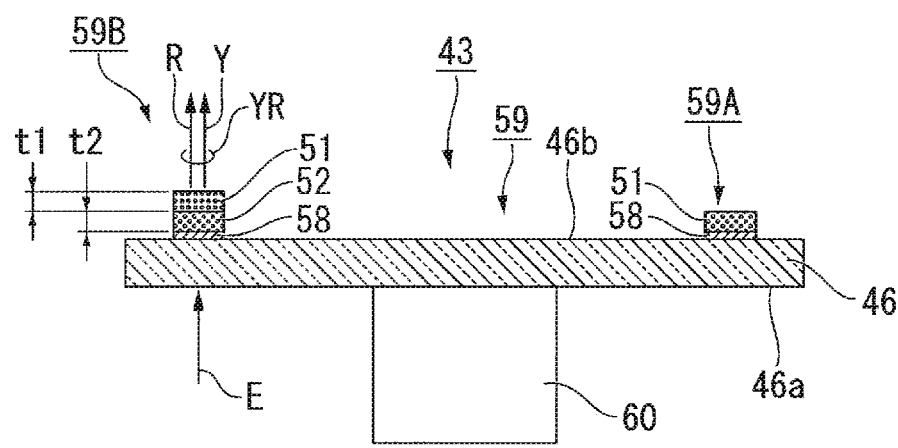
FIG. 7 is a cross-sectional view of a wavelength conversion element according to a fourth embodiment.

FIG. 7 is a cross-sectional view of a wavelength conversion element 43 according to the fourth embodiment.

In FIG. 7, components common to those in the drawings used in the first embodiment have the same reference characters and will not be described in detail.

The wavelength conversion element 43 according to the fourth embodiment includes a substrate 46, the first phosphor layer 51, the second phosphor layer 52, and a dichroic mirror 58 (reflection layer), as shown in FIG. 7. In the present embodiment, the substrate 46 is formed of a transparent substrate made, for example, of glass. The excitation light E is incident on a first surface 46a of the substrate 46 and exits out of a wavelength conversion section 59 provided on a second surface 46b of the substrate 46. That is, the wavelength conversion element 43 according to the present embodiment is a transmissive wavelength conversion element.

The wavelength conversion section 59 having a first region 59A and a second region 59B is provided on the second surface 46b of the substrate 46. The wavelength conversion section 59 includes the first phosphor layer 51 in the first region 59A and further includes the second phosphor layer 52 and the first phosphor layer 51 provided in the second region 59B and sequentially arranged from the side facing the second surface 46b of the substrate 46. In the second region 59B, the thickness t2 of the second phosphor layer 52 is smaller than the thickness t1 of the first phosphor layer 51.

The dichroic mirror 58 is formed of a dielectric multilayer film provided between the substrate 46 and the wavelength conversion section 59. The dichroic mirror 58 is characterized in that it transmits light that belongs to the wavelength region corresponding to the blue light and reflects light that belongs to the wavelength regions corresponding to the green light and the red light.

In the wavelength conversion element 43 according to the present embodiment, the excitation light E incident through the first surface 46a of the substrate 46 passes through the dichroic mirror 58. In the second region 59B, part of the excitation light E is converted in terms of wavelength into the second fluorescence R (red fluorescence R) in the second phosphor layer 52, and the other part of the excitation light E passes through the second phosphor layer 52, reaches the first phosphor layer 51, and is converted in terms of wavelength into the first fluorescence Y (yellow fluorescence Y) in the first phosphor layer 51. Out of the first fluorescence Y and the second fluorescence R, the two types of fluorescence having traveled toward the substrate 46 are both reflected off the dichroic mirror 58 and exit in the same direction out of the wavelength conversion section 59.

The present embodiment also provides the same effects as those provided by the first embodiment, specifically, the wavelength conversion element 43 capable of adjusting the color tone of the exiting light with no decrease in the wavelength conversion efficiency can be provided.

The wavelength conversion section 59 may instead be provided on the first surface 46a of the substrate 46. In this case, the dichroic mirror 58, the second phosphor layer 52, the first phosphor layer 51, and the substrate 46 may be arranged in the presented order along the direction in which the excitation light E travels.

The technical range of the invention is not limited to the embodiments described above, and a variety of changes can be made thereto to the extent that the changes do not depart from the substance of the invention.

For example, as the excitation light source, the semiconductor lasers that emit blue excitation light may each be replaced with a light emitting diode (LED) that emits blue excitation light.

In addition, the number, shape, material, arrangement, and other factors of each of the components that form the wavelength conversion element and the light source apparatus can be changed as appropriate.

In addition, the shape, number, arrangement, material, and other factors of each of a variety of components of the projector are not limited to those in the embodiments described above and can be changed as appropriate.

In the embodiments described above, the projector including the three light modulators is presented by way of example. Instead, the invention is also applicable to a projector that displays color video images via a single light modulator. Further, as each of the light modulators, the liquid crystal panel described above is not necessarily used, and a digital mirror device can, for example, be used.

Further, the case where the light source apparatus according to any of the embodiments of the invention is incorporated in a projector is presented in the embodiments described above, but not necessarily. The light source apparatus according to any of the embodiments of the invention can also be used, for example, in a lighting apparatus and an automobile headlight.

The entire disclosure of Japanese Patent Application No. 2017-201613, filed on Oct. 18, 2017 is expressly incorporated by reference herein.

What is claimed is:

1. A wavelength converter comprising:
    a wavelength conversion element comprising:
        a substrate having a first surface;
        a first phosphor layer that has a first excitation light incident surface on which excitation light having a first wavelength is incident, is so provided as to face the first surface, and converts in terms of wavelength the excitation light into light having a second wavelength different from the first wavelength;
        a second phosphor layer that is provided on the first excitation light incident surface, and converts in terms of wavelength the excitation light into light having a third wavelength different from the first and second wavelengths; and
        a reflection layer that is provided between the first phosphor layer and the substrate and reflects the light having the second wavelength and the light having the third wavelength, wherein:
        the first phosphor layer has an annular shape when viewed in a direction in which the excitation light is incident,
        an area of the second phosphor layer viewed in the direction in which the excitation light is incident is smaller than an area of the first phosphor layer viewed in the direction in which the excitation light is incident, and
        a thickness of the second phosphor layer is smaller than a thickness of the first phosphor layer; and
    a rotation driver that rotates the wavelength conversion element around an axis of rotation perpendicular to the first surface of the substrate.

2. The wavelength converter according to claim 1, wherein
    the second phosphor layer is provided in each of a first position on the first excitation light incident surface of the first phosphor layer and a second position different from the first position.

3. A light source apparatus comprising:
    the wavelength converter according to claim 2; and
    an excitation light source that outputs the excitation light.

4. A projector comprising:
    the light source apparatus according to claim 3;
    a light modulator that modulates light from the light source apparatus in accordance with image information to form image light; and
    a projection optical apparatus that projects the image light.

5. The wavelength converter according to claim 1, wherein:
    the first phosphor layer has an annular shape when viewed in the direction in which the excitation light is incident, and
    the second phosphor layer has a roughly rectangular shape when viewed in the direction in which the excitation light is incident.

6. A light source apparatus comprising:
    the wavelength converter according to claim 3; and
    an excitation light source that outputs the excitation light.

7. A projector comprising:
    the light source apparatus according to claim 6;
    a light modulator that modulates light from the light source apparatus in accordance with image information to form image light; and
    a projection optical apparatus that projects the image light.

8. A light source apparatus comprising:
    the wavelength converter according to claim 1; and
    an excitation light source that outputs the excitation light.

9. A projector comprising:
    the light source apparatus according to claim 8;
    a light modulator that modulates light from the light source apparatus in accordance with image information to form image light; and
    a projection optical apparatus that projects the image light.

10. A wavelength conversion element comprising:
    a substrate having a first surface;
    a first phosphor layer that has a first excitation light incident surface on which excitation light having a first wavelength is incident, is so provided as to face the first surface, and converts in terms of wavelength the excitation light into light having a second wavelength different from the first wavelength;
    a second phosphor layer that converts in terms of wavelength the excitation light into light having a third wavelength different from the first and second wavelengths; and
    a reflection layer that is provided between the first phosphor layer and the substrate and reflects the light having the second wavelength and the light having the third wavelength, wherein:
    the first phosphor layer has an annular shape when viewed in a direction in which the excitation light is incident,
    the first excitation light incident surface of the first phosphor layer has a recess,
    the second phosphor layer is provided in the recess,
    an area of the second phosphor layer viewed in the direction in which the excitation light is incident is smaller than an area of the first phosphor layer viewed in the direction in which the excitation light is incident, and a thickness of the second phosphor layer is smaller than a thickness of the first phosphor layer.

11. The wavelength conversion element according to claim 10, wherein the second phosphor layer is provided in each of a recess at a first position on the first excitation light incident surface of the first phosphor layer and a recess at a second position different from the first position.

12. A wavelength converter comprising:

the wavelength conversion element according to claim 11; and a rotation driver that rotates the wavelength conversion element around an axis of rotation perpendicular to the first surface of the substrate.

13. The wavelength conversion element according to claim 10, wherein the first phosphor layer has an annular shape when viewed in the direction in which the excitation light is incident, and the second phosphor layer has a roughly rectangular shape when viewed in the direction in which the excitation light is incident.

14. A wavelength converter comprising:

the wavelength conversion element according to claim 13; and a rotation driver that rotates the wavelength conversion element around an axis of rotation perpendicular to the first surface of the substrate.

15. The wavelength conversion element according to claim 10, wherein the second phosphor layer has a second excitation light incident surface on which the excitation light is incident, and the first excitation light incident surface and the second excitation light incident surface are located in a roughly the same plane.

16. A wavelength converter comprising:

the wavelength conversion element according to claim 15; and a rotation driver that rotates the wavelength conversion element around an axis of rotation perpendicular to the first surface of the substrate.

17. A wavelength converter comprising:

the wavelength conversion element according to claim 10; and a rotation driver that rotates the wavelength conversion element around an axis of rotation perpendicular to the first surface of the substrate.

\* \* \* \* \*